June 18, 1957 K. INDERAU 2,796,482
ROTARY INERTIA TYPE CONTROL APPARATUS
Filed Jan. 25, 1955
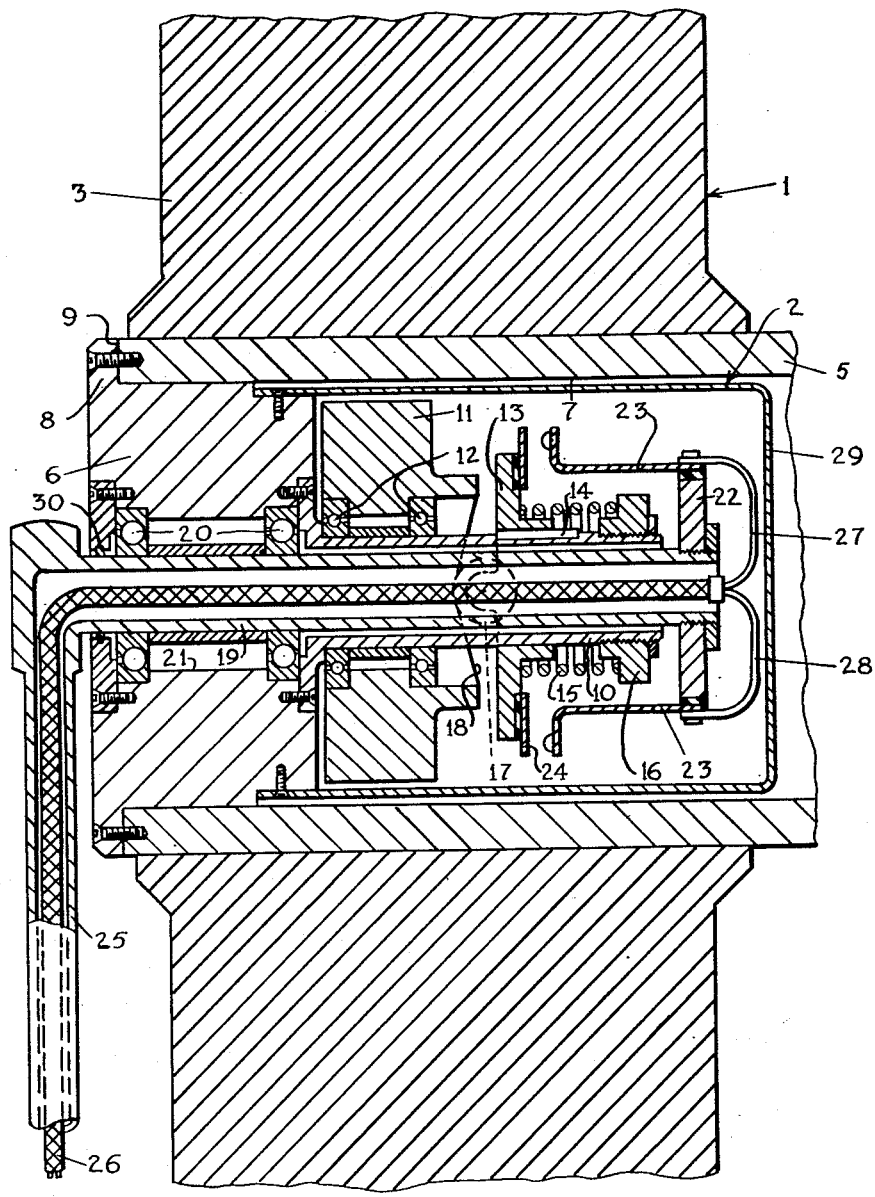
INVENTOR.
Karl Inderau
BY
*Adelbert A. Steinmiller*
ATTORNEY

2,796,482

ROTARY INERTIA TYPE CONTROL APPARATUS

Karl Inderau, Hannover, Germany, assignor to Westinghouse-Bremsen-Gesellschaft, m. b. H., Hannover, Germany Application January 25, 1955, Serial No. 484,047

7 Claims. (Cl. 200—61.46)

This invention relates to rotary inertia control apparatus of the type usually associated with railway type vehicles for controlling the wheel brakes, for example, to prevent sliding of the wheels on the running surface and, more particularly, to adaptations of such apparatus to a wheel-axle unit.

In other known apparatus of the above-described type, the control devices are sometimes positioned adjacent the axle with a special drive such as a belt, chain or gear train, for example, connecting the control device to the axle. These types of drives very often are disadvantageous in that there may be slippage in the case of belt or chain drive and rapid wear in the case of gear drive.

Still further, in other known apparatus of the above-described type, the control devices are positioned on the end of the axle on the outer hub of the wheel, thereby extending the profile of the wheel hub beyond the outer face of the wheel.

Accordingly, one of the objects of the present invention is to provide control apparatus of the above-mentioned type which may be driven directly by the axle, thereby eliminating the necessity of a special drive therefor.

A further object of the invention is to utilize the outer end of the wheel axle by providing a recess therein for housing the control device and thereby eliminating the profile projection of said control device.

Other objects and advantages will become apparent in the following, more detailed description when read in conjunction with the accompanying drawing, which is:

A single figure elevational view, partly in section and partly in outline, showing fragmentarily one end of a wheel and axle unit and the novel arrangement of the rotary inertia controller therewith.

*Description and operation*

The control apparatus embodying the invention comprises a wheel-axle unit, designated by the numeral 1 in the drawing, and a control device 2.

The wheel-axle unit 1, as shown in the drawing, constitutes a rotatable unit comprising of a vehicle wheel such as that of a railway vehicle, for example, a portion 3 of which is shown, and an axle 5 pressed into the wheel hub, only a portion of said axle being shown.

A cylindrical base 6, on which the working parts of the control device 2 are mounted, is inserted and extends part way into a bore 7 at the outer end of the axle 5, said base having a collar 8 abutting against an outer face 9 of the axle whereby said base may be removably secured to said axle for rotation therewith, by suitable means, such as screws, in the manner shown. A hollow regulator shaft 10 is rigidly secured to the inner face of the base 6 in suitable manner, such as by screws shown, and extends away therefrom coaxially into the bore 7. An inertia disc or flywheel 11 is carried for rotation on the regulator shaft 10 by means of two ball-bearing races 12. An annular control member 13, axially movable relative to the shaft 10, is also carried by said shaft adjacent the inertia disc 11, but is secured against rotation on said shaft by a key 14. A spring 15, compressed between the control member 13 and a spring seat 16 secured to the inner end of the shaft 10, biases a roller 17 against a concave cam contour 18 formed on the end of a cylindrical extension of the inertia disc 11, said roller (or pair of rollers disposed in diametrically opposite sides of shaft 10) being carried by the control member 13 on an axis perpendicular to the axis of the control member. In this manner rotational driving force is transmitted from the control member 13 to the inertia disc 11 through the roller (or rollers) 17 and the cam contour (or contours) 18.

A non-rotating hollow arbor or shaft 19 is supported by two axially-spaced ball-bearing races 20 located in a coaxial bore 21 of the base 6 and extends from the exterior of said base, through said bore and the shaft 10. Secured, as by a screw-thread and lock-nut connection, on the inner end of shaft 19 is an annular member 22. Two collector springs 23 are mounted in insulated relation on the member 22 and work in conjunction with an insulated contact ring 24, which is carried by the control member 13, to provide, in effect, an electric control switch for a purpose to be hereinafter explained. The arbor 19 is secured against rotation by a yoke portion 25, integrally formed with or separably attached thereto, the yoke being fastened, in a manner not shown, to a non-rotating portion of the wheel truck (not shown). The arbor 19 and yoke 25 serve as a conduit for an electrical cable 26 comprising wires 27 and 28 respectively connected to and leading from the pair of collector springs 23. If a valve is employed instead of switch contacts, the arbor 19 may serve directly as a fluid pressure conduit or for containing a separate fluid pressure conduit or conduits, leading to the valve.

A cup-shaped protective cover 29 provides protection for all parts of the control apparatus, and is mounted to the inner end of the base 6 in suitable manner, as by screws shown. A suitable ring seal 30 is arranged between the base 6 and the arbor 19 adjacent the outer end of said base to prevent entry of dust and other foreign material into the interior of the control apparatus.

The base 6 may be arranged to be mounted in the hollow end of the axle 5 by having an elastic mounting therebetween so that severe shocks originating in the wheel-axle unit 1 will not be transmitted to the working parts of the control device 2 without some dampening effect. Other modifications may be made in the structure described, such as the employment of a valve instead of the switch contacts, whereby the control device may directly control fluid pressure communication without the intervention of electrical controls.

It will be apparent that the construction and arrangement is such that the entire control device 2 may be installed and removed readily and simply as a unit.

In operation, during normal rotation of the wheel-axle unit 1, that is, when the wheel 3 is rolling on the running surface or rail in correspondence to the speed of the vehicle, the roller 17 will be positioned in the lowermost part of the concave cam contour 18, in which position it is shown in the drawing. The inertia disc 11, by virtue of the rotational force transmitted through the shaft 10 and the control member 13, through the roller 17, will also rotate in correspondence to the rotational speed of the wheel 3. Should the wheel-axle unit 1 be decelerated at an excessive rate, such as occurs when the wheel starts to lock due to excessive braking, the inertia disc 11 will overrun the wheel 3 and, consequently, the shaft 10, to cause an angular displacement of said inertia disc relative to said shaft. Angular displacement of the inertia disc 11 relative to the shaft 10 will cause the roller 17 to ride up the cam contour 18, whereby the control member 13 will be axially displaced relative to said shaft, and the ring 24 will make contact with the contact springs 23, thereby closing an electrical control circuit (not shown) through the cable 26. Closing of the electrical control circuit may be utilized, for example, to effect a release of the brakes applied to the wheel 3.

With the brakes released on the wheel 3, in the manner just described, the wheel is then free to accelerate from its retarded condition back to normal vehicle speed. Sliding or actual locking of the wheel is thus prevented.

Summary

From the foregoing description of the invention, it should be apparent that I have provided a rotary inertia type control apparatus which may be conveniently installed and removed as a unit in the hollow end of a wheel axle without extending the profile of the hub of the wheel-axle unit and which control apparatus utilizes a direct driving connection between the wheel-axle unit and the control apparatus, thereby eliminating any necessity for an interposed driving connection therebetween.

Having now described the invention, what I claim as new and desire to secure by Letters Patent is:

1. A unitary control device comprising an annular base member secured in coaxial relation to a rotatable member for rotation therewith, a tubular shaft secured to one end of said base member in coaxial relation for rotation therewith, an inertia member journaled on said shaft, means establishing a driving connection from said shaft to said inertia member whereby relative rotary movement between said shaft and inertia member occurs upon acceleration or deceleration of the rotatable member, control means actuated responsively to relative rotary movement between said shaft and said inertia member, and conduit means providing communication from said control means to devices controlled thereby and located at a point removed from the rotatable member, said conduit means including a non-rotative tubular arbor extending coaxially through the base member and shaft.

2. A unitary control device comprising an annular base member secured within a recess formed in the outboard end of the axle of a vehicle wheel-axle unit, a tubular shaft secured to the inboard end of said base member and extending further into said recess in coaxial relation to said axle, an inertia member journaled on said shaft, means establishing a driving connection between said shaft and said inertia member whereby relative rotary movement between said shaft and said inertia member may occur upon acceleration or deceleration of said axle, switch means actuated responsively to relative rotary movement between said shaft and said inertia member, a non-rotative arbor in tubular form journaled within the central opening of said base member in coaxial relation to said axle and extending from the outboard end of said axle coaxially through said base member and said shaft whereby to provide a conduit for containing wires to establish electrical connections to said switch means from a portion of the vehicle removed from the wheel-axle unit.

3. A unitary control device as claimed in claim 2, further characterized by a cup-shaped shell removably secured in coaxial relation to said base member and completely enclosing the parts of said control device.

4. The combination with a vehicle wheel-axle unit of a control device installable and removable as a unit within a recess extending inwardly from the outboard end of said axle, said control device including inertia operated switch means responsive to acceleration and deceleration of the said wheel-axle unit, and means providing a conduit for containing wires providing electrical connections to said switch means from a portion of the vehicle removed from said wheel-axle unit, said conduit providing means being in the form of a non-rotative arbor extending coaxially into the recess in the said axle.

5. The combination with a vehicle wheel-axle unit of a control device comprising a base member secured to the axle within a recess formed in the outboard end thereof, a hollow shaft secured in coaxial relation to the inboard end of said base member, an inertia member rotatively journaled on said shaft, an annular drive member arranged to rotate with said shaft and movable axially along said shaft, cam means on said inertia member, roller means on said drive member, means biasing said drive member axially toward said inertia member whereby said cam means and said roller means cooperate to cause rotation of said inertia member by rotation of said drive member and whereby upon rotative acceleration or deceleration of said axle the resulting relative rotary movement of said inertia member and drive member effects axial movement of said drive member, and switch means operated by axial movement of said drive member.

6. The combination set forth in claim 5, further characterized by a non-rotative arbor journaled within said base member and shaft and providing a conduit through which to establish electrical connection to the said switch means.

7. The combination set forth in claim 6, further characterized in that said switch means comprises a contact ring carried by said drive member and a pair of contact springs carried on the end of said arbor inboard of said contact ring in position to be bridged by said contact ring on axial movement of said drive member resulting from acceleration or deceleration of the wheel-axle unit.

References Cited in the file of this patent

UNITED STATES PATENTS

| 1,560,844 | Olds | Nov. 10, 1925 |
| 2,573,386 | Berkoben et al. | Oct. 30, 1951 |

FOREIGN PATENTS

| 677,127 | Great Britain | Aug. 13, 1952 |